United States Patent
Davies et al.

(10) Patent No.: US 6,889,900 B2
(45) Date of Patent: May 10, 2005

(54) METHOD AND SYSTEM FOR ELECTRONIC ROUTE PLANNING AND VIRTUAL QUEUE HANDLING

(75) Inventors: Robert J. Davies, Horley (GB); Paul M. Fulton, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 104 days.

(21) Appl. No.: 10/186,654

(22) Filed: Jul. 1, 2002

(65) Prior Publication Data

US 2003/0010822 A1 Jan. 16, 2003

(30) Foreign Application Priority Data

| Jul. 10, 2001 | (GB) | ............................................. 0116822 |
| Jul. 10, 2001 | (GB) | ............................................. 0116823 |
| Jul. 10, 2001 | (GB) | ............................................. 0116824 |
| May 14, 2002 | (GB) | ............................................. 0210983 |

(51) Int. Cl.$^7$ ............................................. G06F 17/60
(52) U.S. Cl. ............................................. 235/385
(58) Field of Search ............................................. 235/385, 382, 235/376, 382.5, 472.01, 485–487; 340/826.5, 7.23, 7.27; 455/435, 450, 456, 510, 512, 514, 517; 709/217, 218, 219, 224, 226; 705/5

(56) References Cited

U.S. PATENT DOCUMENTS

| 5,226,071 A | * | 7/1993 | Bolliger et al. ........... 455/435.3 |
| 5,592,154 A | * | 1/1997 | Lin et al. .................. 340/825.5 |
| 5,862,485 A | * | 1/1999 | Linneweh et al. .......... 455/450 |
| 5,978,770 A | * | 11/1999 | Waytena et al. ................. 705/5 |
| 6,321,090 B1 | * | 11/2001 | Soliman ..................... 455/440 |
| 6,446,118 B1 | * | 9/2002 | Gottlieb ...................... 709/217 |
| 6,449,646 B1 | * | 9/2002 | Sikora et al. ............... 709/226 |
| 6,690,673 B1 | * | 2/2004 | Jarvis ......................... 370/401 |

FOREIGN PATENT DOCUMENTS

| GB | 2307324 A | 5/1997 | ........... G07C/11/00 |
| WO | WO0146916 | 6/2001 | |
| WO | WO0192910 | 12/2001 | ............. G01S/5/00 |
| WO | WO0201814 | 3/2002 | ........... H04L/12/56 |
| WO | WO0201815 | 3/2002 | ........... H04L/12/56 |

* cited by examiner

Primary Examiner—Thien M. Le
Assistant Examiner—Edwyn Labaze
(74) Attorney, Agent, or Firm—Gregory L. Thorne

(57) ABSTRACT

A queue monitoring system is disclosed. A detection system (10) provides at least one coverage zone (15) covering at least a part of a queuing area (30). A handset (12) is issued to a user, the detection system (10) being arranged to detect the handset (12) when it is within the coverage zone (15) and to record the user of the handset as being in the queue. Queue load is subsequently used to provide recommended itineraries to visitors via the handsets (12).

17 Claims, 2 Drawing Sheets

METHOD AND SYSTEM FOR ELECTRONIC ROUTE PLANNING AND VIRTUAL QUEUE HANDLING

FIELD OF THE INVENTION

The present invention relates to a method and system providing user guidance, ticketing and/or virtual queuing in multi-user closed environments where there are a plurality of interaction opportunities presented to users and popularity of some such opportunities may result in queues or delays as users having to wait their turn for access. Particular examples of such opportunities and environments are rides or other attractions in a theme park and particular shops or counters in a busy shopping mall. Other examples will be apparent to the skilled reader.

BACKGROUND OF THE INVENTION

Queuing and navigation are major discomforts to visitors of environments such as theme parks. The most popular rides or attractions in many theme parks can have queuing times in excess of 30 minutes to an hour during peak season.

The basic idea of virtual queuing is familiar: each visitor can "reserve" themselves a timeslot for a ride, and instead of standing in line for hours they can go off and enjoy the rest of the park. At the appropriate time they return to the ride and gain access quickly via a fast channel.

Amusement parks and similar venues are starting to introduce so-called 'virtual queuing' systems for their rides. Virtual queuing allows the queuer to electronically mark his place in a queue and then go off and do something else. Paper-based virtual queuing systems exist, as do more sophisticated electronic systems such as Disney's Fast-Pass system or a system developed by Lo-Q.

In Disney's Fast-pass service major rides have a kiosk at which visitors can swipe their admission ticket. They are allocated a time slot at which to return to the ride. This (typically) one-hour window allows them to join a shorter queue, so that the actual time standing in line is only a matter of minutes. The problems of this service are that only one reservation may be made at a time, Visitors must go to each ride in advance, and the subsequent return time may be many hours later.

In the system provided by Lo-Q, a small wireless device (a so-called Q-Bot) is hired out for a fixed fee to each visiting group. The devices can be used to reserve a virtual place in a queue for a ride. This is done through a network of base stations. Devices are updated with the times at which each ride may be visited and this information is shown on a small screen. To reserve a place on a ride, there is a kiosk by the ride in close proximity to which the Q-Bot must be held. Using information on the size of the queue (fed to the system by ride operators) and details of which rides the group may go on (for example restrictions based on height or age data held by the Q-Bot) the system then allocates a time slot. On returning later, the visitors join a shorter queue, a receiver communicates with the Q-Bot and if they are permitted to go on the ride a green light is flashed for the benefit of the ride operator. Additionally, alarms go off it the Q-Bot is taken from the park. A child finder service is also possible with simple display-less tags. Drawbacks of the Lo-Q system include the requirement for ride operators to input queue lengths into the system and the limitation that only Lo-Q equipped rides can be used in the system.

In an alternative, ticketed system, the Alton Towers theme park in England uses a simple ticketed system of reserving time slots. The system is described as "A free service available to all customers—On the park's two most popular rides you can join a virtual queue on selected days. All you have to do is walk through the turnstiles close to the rides and collect a ticket, on the ticket you will find a time band, if you return to the ride between these times you can ride with only a short queue."

At least one park owner has discovered that its considerable investment in a virtual queuing system has brought in no extra profits. While people benefit from the reduced time spent in physical queues, they do not spend extra money elsewhere. Since a virtual queuing system represents a considerable investment for the park owner, there is a need for ways to improve the return on it.

In addition, It should be borne in mind that people queuing "physically" might resent being apparently queue-jumped by the virtual queuers. Their ire and, more importantly, consequent dissatisfaction with the park experience might result in less spending or refusal to visit the park again.

BRIEF SUMMARY OF THE INVENTION

According to a first aspect of the present invention, there is provided a queue monitoring system comprising a detection system providing at least one coverage zone covering at least a part of a queuing area and a handset for issue to a user, wherein the detection system is arranged to detect the handset when it is within the coverage zone and to record the user of the handset as being in the queue.

The detection system may provide a second coverage zone, one of the two coverage zones covering the entrance to the queuing area and the other covering the exit, wherein the detection system is arranged to record a user as being in the queue when the respective handset is detected by the coverage zone covering the entrance and is arranged to record the user as not being in queue when the respective handset is detected by the other coverage zone.

The detection system may comprise one or more wireless transmitter/receivers arranged to communicate with the handset, a coverage zone comprising a transmission/reception zone of the wireless transmitter/receiver.

The wireless transmitter/receiver may be a BlueTooth beacon.

The detection system may provide a plurality of coverage zones individually covering all queues within a theme park. Preferably, the detection system provides a plurality of coverage zones between them covering all public areas of the theme park.

The handset may be arranged to be able to communicate with a control system via the detection system when the handset is within a coverage zone. The control system may be arranged to provide directions to the handset in dependence on the coverage zone it is within. The control system may be arranged to accept payment authorisation from the handset to obtain a place in a virtual queue to thereby avoid waiting in a physical queue. A cost for obtaining a place in the virtual queue may be dependent on the physical queue size and/or attraction popularity. The control system may be arranged to credit people in the physical queue when a place in the virtual queue is purchased. The credit may comprise a portion of the payment made to virtually queue.

Preferably, the control system is arranged to compile a recommended itinerary for a handset, the recommended itinerary being determined in dependence on detected queuing loads. The itinerary may comprise a plurality of timed virtual queue places.

The control system may be arranged to prompt and guide a user around a park or other location via messages displayed on the handset in dependence on the virtual queue times.

The system may further comprise a remote access system arranged to generate an itinerary for a user prior to a visit. The remote access system may comprise an extension of the detection system to a hotel or other accommodation.

According to another aspect of the present invention, there is provided an itinerary planning method for attractions employing a queue monitoring system comprising a detection system providing at least one coverage zone covering at least a part of a queuing area and a handset for issue to each user, the detection system being arranged to detect the handset when it is within the coverage zone and to record the user of the handset as being in the queue, the method comprising:

issuing a handset to each user;

maintaining a record of users in each queue; and, generating an itinerary for a user visiting the attractions in dependence on the record of users in each queue and in dependence on other itineraries generated for the same period.

The system and method of the present invention may be used for implementing a ticketing method for permitting access to respective ones of a plurality of interaction opportunities within a given environment, wherein all interaction opportunities are available to a user following payment of a first fee, with the user physically queuing to access each such opportunity, and each interaction opportunity has associated with it a respective second fee on payment of which users join the end of a respective virtual queue for that interaction opportunity with others who have already paid said second fee, with each respective second fee being lower than the first fee.

One embodiment of the present invention replaces the flat-rate hire fee with a per-ride charge. Changing the charging model means that instead of blindly 'virtually-queuing' on every ride, users now have to make a considered decision about which rides they want to queue on virtually. The idea is that by encouraging the user to pay just a very small extra charge per preferred ride, he or she will end up spending more than he or she would be prepared to spend up-front for the flat hire cost.

By charging on a per-use/per-ride basis for the benefit of virtual queuing, increased revenue to a proprietor may result from setting the first fee (requiring physical queuing) at around, say, the cost of four or five rides with virtual queues, users are more likely to pay to queue virtually for a greater number of rides. Whilst those people queuing physically might resent being apparently queue-jumped by the virtual queuers, their ire and, more importantly, consequent dissatisfaction with the park experience should be tempered to some extent by the knowledge that the virtual queuers are paying for the privilege.

In order to address congestion and to attempt to distribute visitors throughout the park, park organisers commonly distribute the most popular rides and attractions across the theme park. Whilst this has a positive benefit to the organisers, it means that visitors must plan visits in detail in order to obtain the best experience from their visit.

In addition, visitors to the theme parks or other resorts or centres are typically not regular visitors. As such, they expect some form of direction or assistance to reach their desired destination. Whilst direction signs are provided, these cannot typically be comprehensive enough to suit everybody's requirements meaning that visitors spend time obtaining directions and being lost instead of enjoying themselves.

The present invention may be operated to provide a user guidance method for directing access to respective ones of a plurality of interaction opportunities within a given environment, wherein a facility is provided to enable users to join virtual queues to access interaction opportunities of interest, and further guidance is provided direct to a user to maximise availability of opportunities whilst minimising queuing times. The guidance may comprise route planning through the environment taking account of, amongst other factors, queuing times for respective opportunities, user preferences and ambient conditions.

In the prior art virtual queuing systems discussed above, whilst a user might be able to queue virtually on a ride-by-ride basis, he lacks any overall guidance on how best to exploit his day bar the paper map that he might have. Even if he has some knowledge of what to expect from the rides themselves, he has no knowledge of the current queuing conditions and operational status. The queuing terminal might be able to provide him of an indication as to when his next ride is due but the present applicants have recognised that it would be even more useful if it were able to provide some advice on which rides to choose and in which order.

It will be appreciated that the present invention seeks to provide a mechanism whereby users of virtual or deferred ticketing systems experience increased benefits from utilising the system whilst at the same time providing improved returns to the proprietor or proprietors supporting the system.

BRIEF DESCRIPTION OF THE DRAWINGS

Further features and advantages of the present invention will now be described, by way of example only, and with reference to the accompanying drawings, in which.

DETAILED DESCRIPTION OF THE INVENTION

Figure 1:
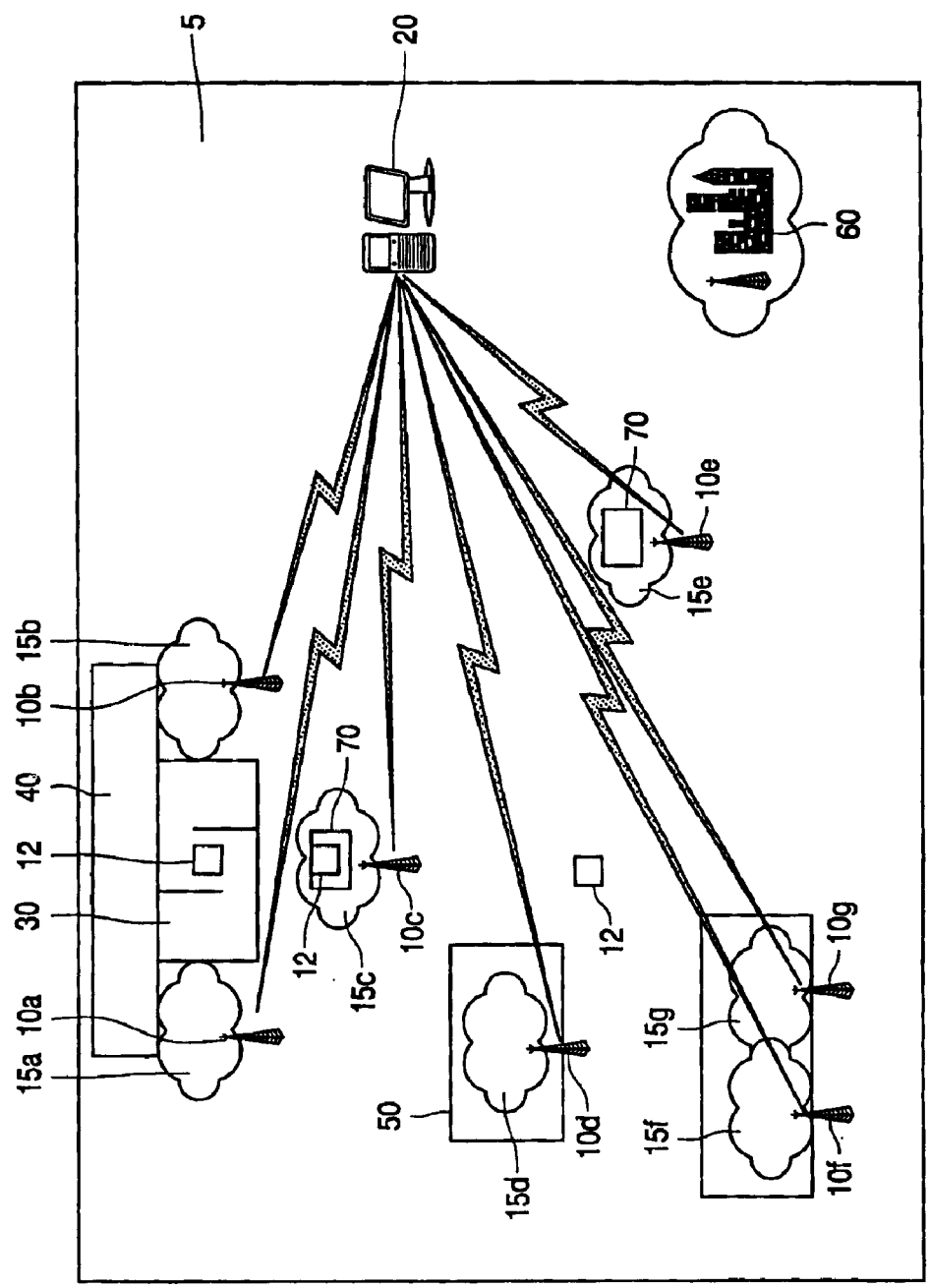
FIG. 1 is a block schematic diagram of a system of interconnected beacons suitable for use in the present invention.

FIG. 1 is a block schematic diagram of a system of interconnected beacons for use in the present invention. A theme park 5 includes a network of beacons 10 (individual beacons are labelled 10a–10g respectively) managed by a central control system 20 which is responsible for virtual queuing (amongst other tasks). Each beacon is positioned so as to provide a specific coverage zone 15a–15g within the park 5. Customers are issued with a handset 12 upon entry to the park 5. The handset includes data uniquely identifying the user and permits the user to communicate with individual beacons 10a–10g of the beacon network 10. Examples of suitable beacon and handset devices are described in our commonly assigned International patent applications WO 02/01814 and WO 02/01815 (agents ref. PHGB000111/112).

In one embodiment, the system supports the automatic detection of the presence of visitors within queues. Beacons 10a and 10b are used to create coverage zones 15a, 15b respectively at the beginning and end of an attraction queue 30 for a ride 40. As the users pass through an entrance coverage zone 15a, each handset communicates an identification tag or signal to the beacon 10a. The beacon 10a alerts the central control system 20 that the user is in a queue. The central control system records this data and only changes this status report when beacon 10b notifies the central control system 20 that the user has passed through an exit coverage zone 15b. In this manner, queue lengths can be monitored automatically in contrast to existing systems which require operators to input queue sizes manually.

Preferably, the beacons 10 are self-contained and are installed around the park 5. Each beacon 10a–10g communicates with the central control system 20, possibly through a wireless link for awkward locations.

Each ride or attraction 50 in the park 5 requires at least one beacon for registering the arrival of visitors and collecting new requests for virtual queuing. In one embodiment, additional beacons could be used to fill in the spaces in the park 5 between rides and attractions 50 to provide total coverage. This allows queuing requests to be uploaded (and information for the whole park to be downloaded) at any time and from any position. Beacons in hotels or other local accommodation 60 for pre-planning complete the coverage.

In a typical embodiment, the system exploits wireless links (based, for example, on Bluetooth or IR) between the handsets 12, the beacons 10 and the central control system 20 that enables information such as user choices, location and ride availability to be exchanged and presented using a protocol such as that developed by Philips Electronics for context-aware mobile phone (CAMP) applications and services. CAMP is capable of integrating many applications and services, of which, route planning is just one.

Booking stations 70 having associated beacons 10c and coverage zones 15c are envisaged for the virtual queuing systems. The booking stations require the user to approach closely and perform some action akin to 'swiping' in order to register (and pay for) a queuing request. For a fully interactive route-planning system, wider area links are preferred, especially when autonomous responses, messages and suggestions are expected to be transmitted to the handset 12 via the beacons 10 from the central controller 20 or a linked system. Since such links are required anyway for such applications as 'lost child finders' and other such services, it makes sense to exploit the same technology. Typically, beacons 10 in the form of radio base stations will be dotted around the park site 5, each with a range of a few tens of meters. Bluetooth is one possible radio protocol that meets these requirements and could be used but others exist.

The handheld devices 12 would initially be custom designed, suitably with a touch screen, keys for the major functions, and an RF system for communication with the beacons 10. Bluetooth communications protocols are suggested for a practical implementation, but the short range, low power protocol Zigbee (as proposed for 802.15.4) could also be used. Implementations may be hosted on Bluetooth enabled mobile phones through downloading of the appropriate software.

In a preferred embodiment of the present invention, the beacon network 10 provides coverage zones 15 across the whole of the park 5. The system allow visitors to request a place in a ride queue at any time of the day and from any place in the park 5, through the handset 12. The handset 12 can alert the users that their timeslot is approaching by some kind of audio and/or visual message. The alert information, and details of the lengths of all the queues in the park, can be broadcast from the network of beacons 10 to the handsets 12. Ride load balancing is a big benefit of such a co-ordinated system. The load on the most popular attractions 40 can be spread across the whole day, and users can be alerted to the shortest queues to fill in the rest of the day. The same queuing system can be used to analyse the movement of individual handsets, because of the continual communications between the handset 12 and the nearest beacons 10.

In the queue size monitoring embodiment described above, the status data of a user could be used by the central control system 20 to change the itinerary of the visitor if necessary, perhaps moving a timeslot back by 10 minutes if a delay on a previous ride was recorded.

Preferably, a virtual currency is used within the park 5 and transactions are performed using the handsets 12 and the network of beacons 10. The general principle is that the user, when hiring the handset 12, will load it up with some virtual money that can be exchanged inside the park 5. One could envisage the use of what we might call q-tokens on the basis of one (or more) q-token per person, per virtual queue. In general, once these are loaded onto the handset 12, the park owner would like the user to spend all tokens rather than have to provide a refund for unused tokens. Q-tokens could therefore also be employed to obtain food and drink or souvenirs (especially ride souvenirs, like photos). A user could be encouraged to spend tokens by such techniques as slightly lower prices for token spenders.

At the end of a visit, remaining fractional tokens, or 'loose change' could be handled either by making it clear that sums under a certain limit will not be refunded or by allowing it to be rounded up to the nearest token for the last transaction. This way, the user is encouraged to spend his last 2.1 tokens by allowing him to buy an item costing 3 tokens with it. The 0.9 token cost can be absorbed by the proprietor owing to the extra spending done by the customer in order to be able to take advantage of this 'bargain' and the cost saving in not having to provide a small refund to the user on his departure.

Additionally, q-tokens can be traded by users. Extra credits are awarded when waiting in long queues is unavoidable or when other users, paying a higher price, have jumped the queue. These may be redeemed in exchange for closer time slots at other attractions. An extension of this idea is that accumulated credits may then be used to move ahead in an actual queue the visitor is at any time waiting in.

Figure 2:
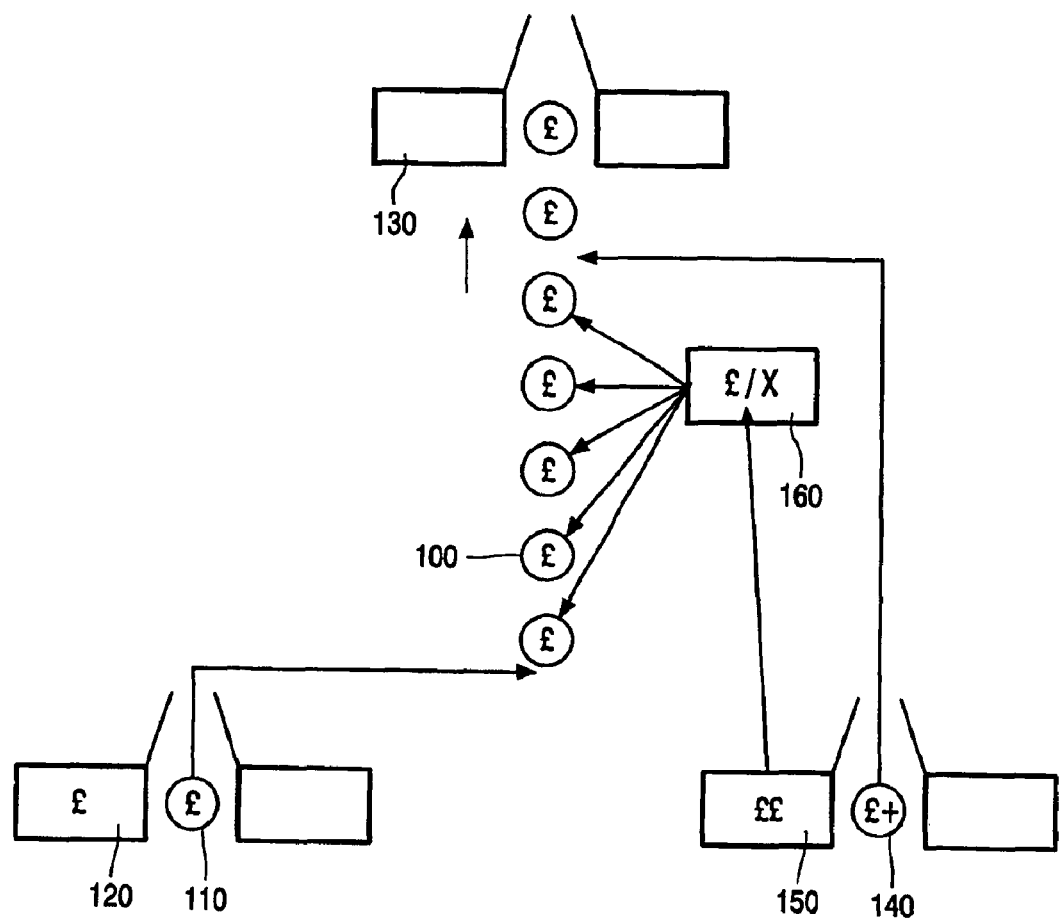
FIG. 2 schematically represents the queuing method of the present invention; and, FIG. 3 is an illustration of a group planning a visit to a park using a system in accordance with an aspect of the present invention.

Referring now to FIG. 2, in an embodiment of the present invention the flat-rate hire fee is replaced with a per-ride charge. Changing the charging model means that Instead of blindly 'virtually-queuing' on every ride, users now have to make a considered decision about which rides they want to queue on virtually. The idea is that by encouraging the user to pay just a very small extra charge per preferred ride, he will end up spending more than he would be prepared to spend up-front for the flat hire cost.

Figure 3:
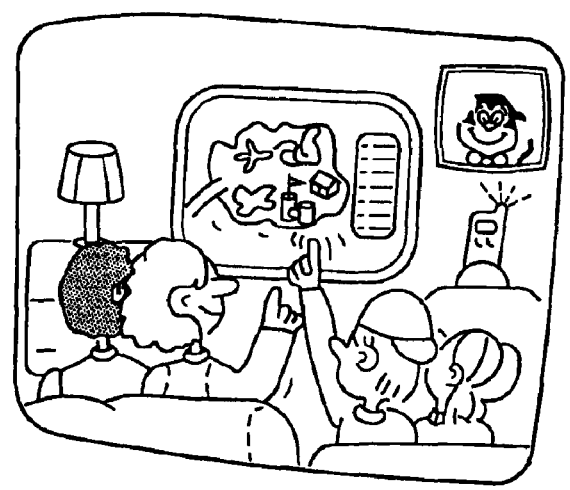

FIG. 3 schematically represents the arrangement whereby a user willing to pay a higher price may obtain an advanced position in a queue, indicated generally at 100. A user 110 who wishes to pay a conventional price (£) passes through a first gate 120 on payment of the fee and joins the end of the queue 100, which queue slowly advances to the point of access 130 to the queued-for service or ride. A second user 140, willing to pay a higher price (££) to obtain a preferential position in the queue, passes through a second gate 150 and is placed closer to the front of the queue 100 than user 110.

In order to avoid dissatisfaction from those users displaced by the insertion of user 140, a utility (illustrated generally at 160) may convert some of the extra profit received by gate 150 to q-tokens which are issued to the handsets 12 of each queuer displaced by the insertion of user 140.

An extension of the virtual queuing schemes described above would allow a certain degree of planning based on the user's ride preferences, current location and current (and predicted) queuing conditions. This benefits the user because his day is better scheduled and he can either fit more rides in or simply waste less time waiting for his turn. The user can choose his rides in several ways. He might choose to simply ask the system 'what next' and have a recommendation or two returned to his or her handset 12 from the central control system 20 based on detected current queuing times and the time it would take for the user to make his way to the ride 40. He or she might prefer to do some forward planning, prioritising his favourite rides or choosing characteristics ('scary', 'wet', 'suitable for young children', etc.) and letting the system devise an itinerary.

FIG. 3 illustrates a visiting group of users undertaking a pre-planning activity. Firstly, the visiting group must inform the system of just which attractions they want to visit. Beacons 10 may be installed in the resort hotels (60; FIG. 1) themselves or a link to the central control system 20 may be provided so that some planning can be done ahead of the visit using the handsets 12 (maybe in conjunction with a TV screen, as in the Figure). This makes the visitors more excited and aware of the full range of things they can do, and allows the central control system 20 to allocate the best times for them to go to all the attractions. This is obviously to the benefit of the consumer, but also the operator who may schedule visits such that the flow of people through the park is more distributed.

The central control system 20 preferably optimises itinerary routes for the least amount of walking between rides (i.e. do not cause the user to zig-zag between opposite ends of the park) and least amount of waiting. An itinerary may be provided to the handset for a complete day, or for a number of hours, or it may be fed one ride or attraction 40 at a time. In all cases, fine-tuning of the itinerary may be provided to the handset 12 by the central controller 20 as the day goes on to take into account queuing conditions, problems with rides and the like.

Such an approach can be readily linked to the virtual queuing systems already described.

By use of the coverage zones 15 and knowledge of the itinerary of a user, personalised directions may be provided to the user to the next ride/attraction 40 from the central control system 20 via the handset 12.

While there are benefits for the users, there are also benefits for the park owner because it provides a degree of load balancing between the rides because recommendations can be biased toward the less busy rides. In addition, the use of the most popular rides can be spread throughout the day. This ensures that all rides are fully utilised and gives a better customer experience, thus increasing the possibility of repeat visits or increasing the attractiveness to potential first-timers and can possibly allow a useful increase in capacity, thus maximising revenues.

As an added benefit, the paths that people take through the park and the rides they choose can be recorded to provide usage statistics.

In the foregoing we have described an electronic virtual queuing system and an associated planning system that allows a user to do more interesting things while waiting to go on a ride, a user may pay to join a queue virtually, and also to actually jump a queue. The premium charged for this is set higher and may be dependent on such factors as current queue length, time of day and general popularity of the ride. Instead of simply 'virtually-queuing' on every ride, users now make a considered decision about which rides they want to queue on virtually, as a small q-token charge per ride may add up to more than the flat hire cost. In operation, the user is provided with a portable terminal holding a number of electronic tokens, which tokens can then be redeemed at rides that support virtual queuing.

Q-tokens may be given to every queue member as compensation for each place they have lost; which q-tokens can be exchanged at other rides or as payment for other goods when a sufficient number have been accumulated. Yet another premium service might be the ability to join more than one queue simultaneously. Current systems allow you to join only one. The ability to join more than one would multiply the queue lengths by a factor related to the number of rides people use. As a restricted service, people might be allowed to pay to join the queue for two or three rides at any time so that they can take the rides in relatively quick succession.

A certain degree of planning can be provided by the central control system 20 and network of beacons 10 based on the user's ride preferences, current location and current (and predicted) queuing conditions. This benefits the user because his day is better scheduled and he can either fit more rides in or simply waste less time waiting for his turn. It also benefits the park owner because it provides a degree of load balancing, ensuring all rides are fully utilised, gives a better customer experience, thus increasing the possibility of repeat visits or increasing the attractiveness to potential first-timers and can possibly allow a useful increase in capacity, thus maximising revenues. As an added benefit, the paths that people take through the park and the rides they choose can be recorded to provide usage statistics. The system exploits wireless links (based, for example, on Bluetooth or IR) between the terminals and the central park controller that enables information like user choices and location and ride availability to be exchanged and presented.

A context-aware solution for virtual queuing can be built upon Bluetooth improvements already developed by the present applicants/assignees and described, for example in the above-referenced commonly-assigned International patent applications WO 02/01814 and WO 02/01815. The Bluetooth Connectionless Broadcasting mode allows truly one-way transmission of information without the need for a normal connection to be set up. This allows many devices to receive the information simultaneously. In this way, every suitably configured handset can receive updated queuing information for all rides in the park without resulting in excessive loading of the beacons. Two-way communication is only required for user-specific changes, and can be done efficiently using a Split Beacon system (as described in the above-referenced International patent application WO 0201815. This scheme allows Bluetooth communications to be performed quickly in public environments.

The coverage of a Bluetooth beacon will be between 10 and 30 meters for the typical theme park environment. If necessary, there is no reason why this could not be extended towards 100 m range for information delivered via connectionless broadcasting.

Whilst the foregoing description concentrates very much on the amusement park or theme park environment on the grounds that queuing will be worst here, the system is not limited to such places and could usefully be employed wherever exhibits or attractions draw large queues; special exhibitions at museums, for example.

Whilst the device used by the user has been described throughout as a handset, it will be apparent that many electronic items such as PDAs, mobile telephones and the like have the technology to be used as the above mentioned handset. In addition, the handset may be any terminal device that is portable—for example it may be incorporated into an item of clothing (or be a device that could be attached to clothing), a bag or the like. In addition, a handset could be integrated into assisted mobility devices for the old or infirm whilst still performing the desired function.

Although defined principally in terms of a software-based or controlled implementation, the skilled reader will be well aware than many of the above-described functional features could equally well be implemented in hardware or a combination of software and hardware.

From reading the present disclosure, other modifications will be apparent to persons skilled in the art. Such modifications may involve other features which are already known in the design, manufacture and use of communications and monitoring systems and/or data network access apparatus and devices and component parts thereof and which may be used instead of or in addition to features already described herein.

What is claimed is:

1. A queue monitoring system comprising:
    a detection system providing a first coverage zone individually associated with and at least enclosing the entrance to a queuing area of an event or attraction to which people in a queue seek entry;
    a uniquely identified handset for issue to a user, said handset including means for permitting said user to obtain a place in a queue for an event or attraction, wherein the detection system is arranged to detect the handset when the handset is within the first coverage zone and to record the user of the handset as physically being in the queue indicative of the user having entered an event or attraction;
    a second coverage zone, covering both the exit of the handset and associated user from the queuing area and from the event or associated attraction; and
    means for automatically removing the user from the first queue when the respective handset is detected as having moved into said first coverage zone, followed by moving from the first to the second coverage zone.

2. The system according to claim 1, wherein the detection system comprises one or more wireless transmitter/receivers arranged to communicate with the handset, a coverage zone comprising a transmission/reception zone of the wireless transmitter/receiver.

3. The system according to claim 2, wherein the wireless transmitter/receiver is a BlueTooth beacon.

4. The system according to claim 1, wherein the detection system provides a plurality of associated pairs of first and second coverage zones individually covering all queue within a theme park having multiple attractions and/or events.

5. The system according to claim 4, wherein the detection system provides a plurality of coverage zones between them covering all public areas of the theme park.

6. The system according to claim 1, wherein the handset in arranged to be able to communicate with a control system via the detection system when the handset is within a coverage zone.

7. The system according to claim 6, wherein the control system is arranged to provide directions to the handset in dependence on the coverage zone the handset is within, for guiding a user to the location of an attraction.

8. The system according to claim 6, in which the control system is arranged to accept payment authorization from the handset to obtain a place in a virtual queue to thereby avoid waiting in a physical queue.

9. The system according to claim 8, wherein a cost for obtaining a place in the virtual queue is dependent on the physical queue size and/or attraction popularity.

10. The system according to claim 8, wherein the control system is arranged to credit people in the physical queue when a place in the virtual queue is purchased.

11. The system according to claim 10, wherein the credit comprises a portion of the payment made to virtually queue.

12. The system according to claim 6, wherein the control system is arranged to compile a recommended itinerary for a handset, the recommended itinerary being determined in dependence on detected queuing loads.

13. The system according to claim 12, wherein the itinerary comprises plurality of timed virtual queue places.

14. The system according to claim 13, wherein the control system is arranged to prompt and guide a user around a theme park via messages displayed on the handset in dependence on the virtual queue times.

15. The system according to claim 13, further comprising a remote access system arranged to automatically generate an itinerary for a user prior to a visit from a list of attractions previously provided by the user to the system.

16. The system according to claim 15, in which the remote access system comprises an extension of the detection system to a hotel.

17. An itinerary planning method for attractions employing a queue monitoring system comprising a detection system providing at least a and a handset for issue to each user, the first coverage zone covering the entry of a user into a queuing area, and a second coverage zone covering the exit of a user from a queuing area, detection system being arranged to detect the handset when the handset is within the coverage zone and to record the user of the handset as being in the queue, the method comprising:
    issuing a handset to each user;
    maintaining a record of users in each queue;
    generating in response to a request from a user, a proposed optimized itinerary for the user visiting the attractions in dependence on the record of users in each queue and in dependence on other itineraries generated for the same period; and
    automatically removing a user from a queue in response to detecting their associated handset successively first entering an associated said first coverage zone followed by moving into an associated said second coverage zone.

* * * * *